United States Patent [19]
Ichikawa et al.

[11] 3,821,187
[45] June 28, 1974

[54] PROCESS FOR PRODUCING CYCLIC COMPOUNDS OF CONJUGATED DIENE POLYMERS

[75] Inventors: Mitsuo Ichikawa, Tokyo; Yoshiyuki Harita; Mitsuru Tashiro, both of Yokohama; Haruo Ito, Kawasaki, all of Japan

[73] Assignee: Japan Synthetic Rubber Company Limited, Tokyo, Japan

[22] Filed: May 16, 1973

[21] Appl. No.: 360,651

Related U.S. Application Data

[63] Continuation-in-part of Ser. No. 182,820, Sept. 22, 1971, abandoned.

[30] Foreign Application Priority Data
June 25, 1971 Japan.............................. 46-46130

[52] U.S. Cl........ 260/94.7 HA, 260/83.3, 260/83.5, 260/85.1, 260/96 R
[51] Int. Cl............................................. C08d 5/04
[58] Field of Search......... 260/94.7 HA, 96 R, 85.1, 260/83.3

[56] References Cited
FOREIGN PATENTS OR APPLICATIONS
40,537    1965    Japan................................ 260/94.7
1,032,534    1964    Great Britain..................... 260/94.7
1,451,554    1964    France............................... 260/94.7

OTHER PUBLICATIONS

Molecular Weight Jump Reaction by Engel et al.; Rubber Age, Pages 410–415, December 1964.

*Primary Examiner*—Joseph L. Schofer
*Assistant Examiner*—William F. Hamrock
*Attorney, Agent, or Firm*—Toren, McGeady and Stanger

[57] ABSTRACT

A process for producing cyclic compounds of conjugated diene polymers which comprises bringing at least one polymer selected from the group consisting of conjugated diene polymers and copolymers having unsaturated bonds in the main chain or side chain into contact with a catalyst composed of at least one compound selected from the group consisting of organo-aluminum halides represented by the general formula $R_2AlX$ or $R_3Al_2X_3$ (wherein R is alkyl group having one to 12 carbon atoms and X is a halogen) and at least one organic halogenated compound.

4 Claims, No Drawings

PROCESS FOR PRODUCING CYCLIC COMPOUNDS OF CONJUGATED DIENE POLYMERS

CROSS REFERENCES TO RELATED APPLICATIONS

This application is a continuation-in-part of copending application Ser. No. 182,820, filed Sept. 22, 1971 abandoned.

BACKGROUND OF THE INVENTION

1. Field of the Invention

This invention relates to a process for producing cyclic compounds of conjugated diene polymers, and more specifically to a process for the intramolecular cyclization of conjugated diene polymers having unsaturated bonds in the main or side chain by the use of a novel catalyst composed of an organoaluminum halide and an organic halogenated compound.

2. Description of the Prior Art

The manufacture of so-called cyclized rubber through cyclization of natural rubber has long been known from the literature including a number of patents. Known cyclizing processes include (1) a reaction of rubber and sulfuric acid or sulfonate; (2) dehydrohalogenation of rubber hydrohalide; (3) heating; (4) a reaction of rubber and a halide of an amphoteric metal, e.g., $SnCl_2$, $SnCl_4$, $BF_3$, $FeCl_3$, $TiCl_4$, or $SbCl_4$; and (5) a reaction of rubber latex and sulfuric acid.

Cyclic compounds of polymers having unsaturated bonds in the side chains are known to be obtained, for example, in the form of monocyclic polymers by subjecting a solution of 1,2-polybutadiene in xylene to the action of concentrated sulfuric acid, or in the form of polycyclic ladder-shaped polymers by subjecting a dilute solution of 3,4-polyisoprene to the action of a cationic condensing agent, e.g., $BF_3$ or $POCl_3$.

SUMMARY OF THE INVENTION

It has now been found that intramolecularly cyclized c0ompounds can be produced easily with a high efficiency by using a novel catalyst composed of an organoaluminum halide and an organic halogenated compound. The present invention is predicated upon this discovery. Thus, the invention provides a process for producing such cyclic compounds of conjugated diene polymers by bringing a conjugated diene polymer having unsaturated bonds in the main or side chain into contact in solution with a catalyst composed of an organoaluminum halide represented by the general formula $R_2AlX$ or $R_3Al_2X_3$ (wherein R is an alkyl group having one to 12, preferably one to six, carbon atoms and X is a halogen) and an organic halogenated compound the concentration of said polymer being less than about 2 percent by weight.

DESCRIPTION OF THE PREFERRED EMBODIMENT

Conjugated diene polymers having unsaturated bonds in the main or side chain which may be used in the practice of the present invention are homopolymers or copolymers of conjugated dienes having in their polymer chains the units which can be represented as

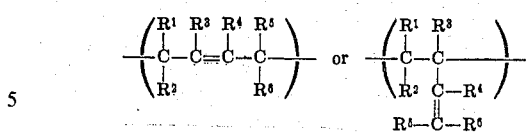

wherein $R^1$ to $R^6$ are hydrogen atoms, alkyl groups or aryl groups. Examples of these units are cis-1,4-polybutadiene, trans-1,4-polybutadiene, cis-1,4-polyisoprene, trans-1,4-polyisoprene, cis-1,4-polypentadiene, trans-1,4-polypentadiene, 1,4-poly(2-phenylbutadiene), 1,2-polybutadiene, 3,4-polyisoprene, 1,2-polypentadiene, and 3,4-poly(2-phenylbutadiene) units. Among the unsaturated monomers which are copolymerizable with these conjugated diene units are vinyl aromatic compounds, such as, styrene and α-methylstyrene, vinylcyano compounds, such as, acrylonitrile, and unsaturated carboxylic acid esters, such as, acrylate and methacrylate.

Suitable organoaluminum halides which may be used as a component of the catalyst according to this invention include diethyl aluminum chloride, dihexyl aluminum chloride, diisobutyl aluminum chloride, diethyl aluminum bromide, diisobutyl aluminum bromide, dihexyl aluminum bromide, ethyl aluminum sesquichloride, isobutyl aluminum sesquichloride, ethyl aluminum sesquibromide and isobutyl aluminum sesquibromide. The other catalyst component may be chosen from various organic halogenated compounds, for example, aliphatic halides, such as, t-butyl chloride and isopropyl iodide; unsaturated halides, such as, 1,4-dichlorobutene-2,allyl chloride, and methallyl bromide; aromatic halides, such as benzyl chloride and di(bromomethyl) benzene; and halogenated-acetic acids which are represented by the general formula $CHnX'_{3-n}$ COOH (wherein X' is a halogen and n is 0, 1 or 2), such as, trichloro-, dichloro-, monochloro-, trifluoro-, difluoro-, monofluoro-, tribromo-, dibromo-, and monobromoacetic acids. Such an organic halogenated compound is used in an amount ranging from 25 to 300 mol percent, preferably from 50 to 200 mol percent on the basis of the amount of an organoaluminum halide.

Useful solvents for the practice of this invention are, for example, inert hydrocarbons, such as pentane, hexane, heptane, benzene, and toluene, and inert halogenated hydrocarbons, such as, methylene dichloride and chlorobenzene.

In order to obtain the cyclized polymer resulting from the intramolecular cyclization of conjugated diene polymers, the concentration of such polymer in the reaction mixture is particularly important and should be between about 0.1 to 2 percent by weight and preferably between 0.4 to 1 percent by weight. In an adequate solvent the cyclization reaction proceeds smoothly with little gelation, and therefore the starting material polymer can be maintained in a high concentration and the desired cyclized polymer is produced with a high efficiency.

The reaction according to this invention may be carried out at any temperature. A temperature above 0° C, however, is preferably employed, especially when a poor solvent, such as methylene dichloride, is used.

The present invention will be illustrated by the following examples, although it should be understood that this invention is not limited thereto but numerous modifications are possible without departing from the spirit of the invention. In the examples, intrinsic viscosity [η]

of the polymer was measured in a toluene at 30° C, and degree of cyclization was measured by NMR spectroscopic method.

As noted hereinabove, the cyclization effected by the present invention is an intramolecular cyclization wherein an individual polymer molecule cyclizes within itself. This is to be contrasted with an intermolecular cyclization where two or more molecules of polymer react with each other to form cyclic polymers. In the latter case, intermolecular cyclization, since it in effect is a further polymerization, results in an overall increase in viscosity. In contrast, in the present process, the product possesses the same or a lower viscosity than the starting material.

EXAMPLE 1

In a round-bottomed flask having a capacity of one liter and equipped with a magnetic rotor, 5.4 g of cis-1,4-polybutadiene (cis 97.5 percent, trans 1.2 percent, vinyl 1.3 percent $[\eta] = 2.98$), was placed and the flash was evacuated and then the normal pressure was restored with nitrogen. With the addition of 764 ml of toluene the system was made a homogeneous solution. Next, 20 ml of a solution of 1,4-dichlorobutene-2 in toluene (0.5 mol/l), and then 10 ml of a solution of diethyl aluminum chloride in toluene (1 mol/l) were added, and a reaction was effected for 15 seconds at a temperature of 20° C. Throughout the operation the system in the nitrogen atmosphere was continuously stirred with the rotor. The reaction was terminated by the addition to the system of a solution of 2,6-di-tert.-butyl-p-cresol in methanol and hydrochloric acid. The reaction mixture was placed in 3 l of methanol to recover the product. After washing with a large volume of methanol, the product was dried under reduced pressure.

The product, obtained in powdery form, was easily soluble in organic solvents, such as toluene, benzene, chloroform, and carbon disulfide. $[\eta]$ was 0.25. An infrared absorption spectrum of the resulting polymer showed no change in the proportions of the cis and vinyl structures from that of the starting polymer. However, an NMR spectrum of the reaction product, in the form of a solution in carbon disulfide, revealed a considerable decrease in the amount of proton due to the unsaturated group and a new peak due to the presence of saturated methylene and methyne. Also, GPC examination of the reaction product indicated that it consisted of a substantially homogeneous composition because it has a unimodal GPC curve although the curve is slightly extended toward the higher molecular weight side. Moreover, a decrease in the intrinsic viscosity, or a property which generally characterizes cyclized product was observed. From these facts it was evident that the reaction product was cyclized product of cis-1,4-polybutadiene.

The proportion of the cyclized double bonds (or the degree of cyclization) was 92 mol percent (per butadiene unit), and the amount of toluene molecules introduced into the product was less than 5 mol percent.

EXAMPLE 2

The procedure of Example 1 was repeated excepting that 1,4-dichlorobutene-2 was replaced by other organic halogenated compounds and the reaction time was extended from 15 to 30 seconds, and powdery products were obtained. The results are given in Table 1.

Table 1

| Organic halogenated compound | Reaction time | Product form | $[\eta]$ | Degree of cyclization |
|---|---|---|---|---|
| t-Butyl chloride | 30 sec. | Powder | 0.33 | 88 mol % |
| Benzyl chloride | 30 sec. | do. | 0.34 | 89 |
| None * | 1 hr. | Rubber | 2.98 | 0 |

* A referential example

EXAMPLE 3

Into an ampoule having a capacity of 100 ml a magnetic rotor was placed, and the atmosphere for the system was replaced by nitrogen. Then 0.34 g of cis - 1,4 - polyisoprene ($[\eta] = 4.03$), 36 ml of chlorobenzene, and 0.2 ml of a solution of benzyl chloride in chlorobenzene (1 mol/l) were charged into the vessel to form a homogeneous solution. Next, 0.2 ml of a solution of diethyl aluminum chloride in chlorobenzene (1 mol/l) was added, and a reaction was carried out for 12 minutes. The product was recovered in the same manner as described in Example 1.

A powdery product was obtained. $[\eta] = 0.19$.

EXAMPLE 4

The procedure of Example 3 was repeated excepting that cis - 1,4 - polyisoprene was replaced by 0.27 g of rubberlike 1,2-polybutadiene (vinyl 85 percent, cis 15 percent, $[\eta] = 2.25$), and a reaction time of 11 minutes was adopted. A powdery product resulted. $[\eta] = 0.98$.

An infrared absorption spectrum of the reaction product for the examination of the microstructure of the resulting polymer showed no change in the proportions of the cis and vinyl components from that of the raw polymer. However, an NMR spectrum of a reaction product in the form of a solution in carbon disulfide showed a remarkable decrease in the vinyl content (unsaturated group content) and an increase in the peak area due to saturated methylene and methyne. A GPC analysis of the reaction product revealed that it consisted of a homogeneous composition because the components are normally distributed with one peak. From these facts the reaction product is evidently identified to be cyclized product of 1,2-polybutadiene. Differential heat analysis of the product indicated that the decomposition point of the product in air is in the vicinity of 350° C and is not in any way affected by heating up to 300° C.

EXAMPLE 5

A magnetic rotor was placed in an ampoule having a capacity of 100 ml, and the atmosphere inside was replaced by nitrogen, and then a predetermined amount of toluene such as the total volume of the following reaction mixture is determined to be 40 ml, 5 ml of a solution of 0.27 g of cis-1,4-polybutadiene (the same polymer as used in Example 1) in 5 ml of toluene and also the desired amount of solution of an organic halogenated compound in toluene (0.5 mol/l) were introduced into the vessel to form a homogeneous solution. Next, a predetermined amount of a solution of ethyl aluminum sesquichloride in toluene (0.5 mol/l) was added, and a reaction was carried out. The product was recovered in the same manner as described in Example 1. The results were as shown in Table 2.

Table 2

| Organic halogenated compound | | Ethyl aluminum sesquichloride | Reaction time | Product [η] | Form | Degree of cyclization (mol %) |
|---|---|---|---|---|---|---|
| None * | mmol | 0.75 mmol | 13 min. | 2.67 | Rubber | — |
| Benzyl chloride | 0.25 | 0.5 | 14 | 0.70 | Powder | 69 |
| do. | 0.5 | 0.5 | 20 | 0.21 | do. | — |
| Trichloroacetic acid | 0.25 | 0.25 | 13 | 1.11 | Rubber | — |

* A referential example

EXAMPLE 6

Cis-1,4-polybutadiene (the same polymer as used in Example 1), in an amount of 54.1 g was dissolved in dry methylene dichloride to a total volume of 1000 ml, and the solution was stored in a nitrogen atmosphere.

A 100 ml ampoule equipped with a magnetic rotor was dried with direct flame under reduced pressure, filled with nitrogen, reduced in the inner pressure, and then normal pressure was regained with nitrogen.

With the supply of a nitrogen stream, 34 ml of dry methylene dichloride and 5 ml of the rubber solution prepared beforehand were placed in the ampoule and were mixed together with a magnetic stirrer to form a homogeneous solution. Next, 0.5 ml of a solution of diethyl aluminum chloride in methylene dichloride (1 mol/l) and then a predetermined amount of a solution of trichloroacetic acid in methylene dichloride (1 mol/l) were added to initiate the reaction. After a predetermined period of time, a solution of 2,6-di-tert-butyl-p-cresol in methanol and hydrochloric acid was added as a terminator to the reaction system. The resultant was thrown in a large volume of methanol, and a reaction product was recovered.

The entire procedure above described was carried out under a nitrogen stream and at 20° C with constant stirring. The results are given in TABLE 3.

Table 3

| Exp. No. | Trichloroacetic acid | Reaction time | Form of product | [η] | Degree of cyclization mol % |
|---|---|---|---|---|---|
| 1* | 0 mmol | 1 min. | Rubber | 2.98 | 0 |
| 2 | 0.5 | 1 | Rubber | 1.12 | — |
| 3 | 0.75 | 1 | Powder | 0.75 | 58 |
| 4 | 1.0 | 1 | Rubber | 1.81 | — |
| 5 | 1.25 | 1 | Rubber | 2.15 | — |

* A referential example

These reaction products were all soluble in toluene.

EXAMPLE 7

Reactions were carried out in the same manner as described in Example 6 excepting that methylene dichloride as the solvent was replaced by chlorobenzene. The results are given in Table 4. These reaction products were soluble in toluene.

Table 4

| Exp. No. | Trichloroacetic acid | Reaction time | [η] | Form of product |
|---|---|---|---|---|
| 6 | 0.75 mmol | 1 hr. | 0.59 | Powder |
| 7 | 1.0 | 1 | 0.48 | Powder |
| 8 | 1.25 | 1 | 1.39 | Rubber |

EXAMPLE 8

Reactions were effected in accordance with Example 6 excepting that methylene dichloride as the solvent was replaced by toluene, the amount of trichloroacetic acid as a catalyst component was fixed to 0.75 mmol, and the reaction temperature was varied. The results are shown in Table 5.

Table 5

| Exp. No. | Reaction temp. | Reaction time | [η] | Form of product |
|---|---|---|---|---|
| 9 | −70°C | 20 min | 2.92 | Hard rubber |
| 10 | −30 | 20 | 2.28 | do. |
| 11 | 0 | 20 | 1.14 | Powder |
| 12 | 20 | 20 | 0.55 | do. |
| 13 | 40 | 20 | 0.61 | do. |

EXAMPLE 9

Reactions were effected in the same manner as described in Example 6 excepting that methylene dichloride as the solvent was replaced by toluene, diethyl aluminum chloride as a catalyst component was replaced by one of other dialkyl aluminum halides, and a common reaction time of one hour was used.

The results are shown in Table 6. The reaction products were soluble in toluene.

Table 6

| Exp. No. | Dialkyl aluminum halide | Trichloroacetic acid | [η] | Form of product |
|---|---|---|---|---|
| 14 | Diethyl aluminum bromide | 0.75 mmol | 0.62 | Resin |
| 15 | do. | 1.0 | 0.74 | do. |
| 16 | Diisobutyl aluminum chloride | 0.75 | 0.46 | Powder |
| 17 | Diisobutyl aluminum chloride | 1.0 | 0.35 | Powder |

EXAMPLE 10

Reactions were effected by the same procedure as described in Example 6 excepting that methylene dichloride as the solvent was replaced by toluene, trichloroacetic acid as a catalyst component was replaced by one of other halogenated acetic acids, and a common reaction time of 1 hour was used. The results are given in Table 7. The reaction products were soluble in toluene.

Table 7

| Exp. No. | Halogenated acetic acid | Amount used | [η] | Form of product |
|---|---|---|---|---|
| 18 | Trifluoroacetic acid | 0.75 mmol | 0.49 | Powder |
| 19 | do. | 1.0 | 0.31 | do. |
| 20 | Dichloroacetic acid | 0.75 | 1.87 | Rubber |
| 21 | Monochloroacetic acid | 1.25 | 2.49 | do. |

EXAMPLE 11

Reactions were carried out by the same procedure as described in Example 6 excepting that toluene was used in lieu of methylene dichloride as the solvent, 68.12 g/l of cis-1,4-polyisoprene ([η] = 4.03) solution was employed as the conjugated diene polymer, and a common reaction time of 3 hours was used. Table 8 shows the results.

Table 8

| Exp. No. | Trichloro-acetic acid | [η] | Form of product |
|---|---|---|---|
| 22 | 0.5 mmol | 0.70 | Powder |
| 23 | 0.75 | 0.30 | do. |
| 24 | 1.0 | 0.19 | do. |
| 25 | 1.25 | 0.80 | do. |

EXAMPLE 12

In the same manner as described in Example 6 excepting that chlorobenzene was used in place of methylene dichloride as the solvent, a 72.12 g/l solution of commercially available solutionpolymerized SBR (styrene content 25 percent, butadiene unit consisting of cis 40 percent, trans 47 percent, vinyl 13 percent, [η] = 2.16) was employed as the conjugated diene polymer, and the reaction time was fixed to be 30 minutes. The results are given in Table 9.

Table 9

| Exp. No. | Trichloro-acetic acid | [η] | Form of product |
|---|---|---|---|
| 26 | 0.25 mM | 1.62 | Rubber |
| 27 | 0.5 | 0.85 | Resin |
| 28 | 0.75 | 0.39 | Powder |
| 29 | 1.0 | 0.54 | do. |
| 30 | 1.25 | 1.99 | Rubber |

EXAMPLE 13

Purified and dried rubberlike 1,2-polybutadiene (vinyl 85 percent, cis 15 percent [η] = 1.85), in an amount of 54.09 g was dissolved in dry methylene dichloride to a total volum of 1,000 ml, and the solution was stored in a nitrogen atmosphere.

A 100 ml ampoule equipped with a magnetic rotor was dried with direct fire under reduced pressure, filled with nitrogen, and the pressure was reduced again, and finally the normal pressure was restored with nitrogen.

With a nitrogen stream, 34 ml of dry methylene dichloride and 5 ml of the rubber solution were placed into the ampoule, mixed up with a magnetic stirrer to form a homogeneous solution. With the addition of 0.5 ml of a solution of diethyl aluminum chloride in methylene dichloride (1 mol/l) and a predetermined amount of a solution of trichloroacetic acid in methylene dichloride (1 mol/l) a reaction was initiated. After the lapse of a predetermined period of time, a solution of 2,6-di-tert-butyl-p-cresol in methanol and hydrochloric acid was added as a reaction terminator to the reaction system. By throwing the reaction mixture into a large volume of methanol, a reaction product was recovered.

The entire procedure above described was carried out with stirring under a nitrogen stream at 20° C. The results are shown in Table 10.

TABLE 10

| Exp. No. | Trichloro-acetic acid | Reaction time | Form of product | [η] | Degree of cyclization mol% |
|---|---|---|---|---|---|
| 31* | 0 mmol | 1 min. | Rubber | 1.85 | 0 |
| 32 | 0.25 | 1 | Powder | 1.23 | — |
| 33 | 0.5 | 1 | do. | 0.42 | 46 |
| 34 | 0.75 | 1 | do. | 0.18 | — |
| 35 | 1.0 | 1 | do. | 1.16 | — |
| 36 | 1.25 | 1 | Rubber | — | — |

* A referential example

All of the reaction products were soluble in toluene.

EXAMPLE 14

Reactions were carried out by the same procedure as in Example 13 excepting that methylene dichloride was replaced by other solvents. Table 11 shows the results.

TABLE 11

| Exp. No. | Trichloro-acetic acid | Solvent | Reaction time | Form of product | [η] | Degree of cyclization mol% |
|---|---|---|---|---|---|---|
| | mmol | | | | | |
| 37 | 0.75 | Toluene | 5 min. | Powder | 0.61 | 76 |
| 38 | 0.75 | Benzene | 60 | do | 0.24 | 60 |
| 39 | 0.5 | Chloro-benzene | 30 | do | 1.68 | 54 |

NMR spectra of the reaction products showed that some aromatic nuclei had gained entrance into Exp. Nos. 37 and 38.

EXAMPLE 15

The proportion of trichloroacetic acid as a catalyst component was fixed to be 0.75 mmol, and the order of addition of the materials and catalyst was varied. Otherwise the same procedure as described in Example 13 was followed to carry out reactions. The results were as shown in Table 12.

Table 12

| Exp. No. | Order of addition | Reaction time | [η] | Form of product |
|---|---|---|---|---|
| 40 | (1) CH$_2$Cl$_2$ (2) rubber solution (3) CCl$_3$COOH (4) (C$_2$H$_5$)$_2$AlCl | 1 min. | 0.34 | Powder |

Table 12-Continued

| Exp. No. | Order of addition | Reaction time | [η] | Form of product |
|---|---|---|---|---|
| 41 | (1) CH₂Cl₂ (2) (C₂H₅)₂AlCl (3) CCl₃COOH(stir. 10°C 30 min.) (4) rubber solution | 1 | 1.64 | Powder |

EXAMPLE 16

In the same manner as described in Example 13 excepting that trichloroacetic acid as a catalyst component was replaced by other halogenated acetic acids, reactions were carried out. The results are given in Table 13. The products were soluble in toluene.

Table 13

| Exp. No. | Halogenated acetic acid | (Amount used) | Reaction time | Form of product |
|---|---|---|---|---|
| 42 | CF₃COOH | 0.5 mmol | 2 hr. | Powder |
| 43 | CBr₃COOH | 0.5 | 2 | do. |
| 44 | CH₂ClCOOH | 0.25 | 2 | do. |
| 45 | CHCl₂COOH | 0.25 | 2 | do. |

EXAMPLE 17

The procedure of Example 13 was repeated excepting that diethyl aluminum chloride as a catalyst component was replaced by 0.75 mmol each of other dialkyl aluminum halides and 0.75 mmol of trichloroacetic acid was used to carry out reactions.

Table 14

| Exp. No. | Dialkyl aluminum halide | Reac. time | Form |
|---|---|---|---|
| 46 | Diethyl aluminum bromide | 2 hr. | Powder |
| 47 | Diisobutyl aluminum chloride | 2 | do. |

EXAMPLE 18

Excepting that crystalline 1,2-polybutadiene ([η] = 1.60, degree of crystallization 15 percent) was used in place of rubberlike 1,2-polybutadiene and 0.75 mmol of trichloroacetic acid was used, and the reaction time was fixed to be 20 seconds, the same procedure as described in Example 13 was repeated, and a reaction product was obtained in powdery form.

[η] = 0.28 Degree of cyclization = 51 mol percent

EXAMPLE 19

A powdery product was obtained by a reaction carried out in the same manner as described in Example 14 excepting that a solution of rubberlike 1,2-polybutadiene was replaced by 68.12 g of rubberlike 3,4-polyisoprene ([η] = 3.19) in a liter of the rubber solution, 0.75 mol of trichloroacetic acid was used, and the reaction was effected for one minute. An infrared absorption spectrum showed no change in the microstructure of the product and a decrese in the extinction coefficient of the peak due to the presence of unsaturated groups.

[η] = 0.16

EXAMPLE 20

Reaction was carried out by the same procedure as described in Example 5 excepting that chlorobenzene was used in place of toluene as the solvent, 68.2 g/l of cis-1,4-polyisoprene ([η] = 4.03) solution was employed as the conjugated diene polymer, 0.1 mmol of benzyl chloride and 0.1 mmol of ethylaluminum sesquichloride was used and the reaction time was 4 minutes, and a reaction product was obtained in powder form.

[η] = 0.28 Degree of cyclization = 94 mol%

EXAMPLE 21

Reaction was carried out by the same procedure as described in Example 5 excepting that rubbery 1,2-polybutadiene (the same polymer as used in Example 14) was used in place of cis-1,4-polybutadiene, 0.2 mmol of benzylchloride and 0.2 mmol of ethylaluminum sesquichloride was used and the reaction time was 7 seconds, and a reaction product was obtained in powder form.

[η] = 0.72 Degree of cyclization = 67 mol percent

What is claimed is:

1. A process for producing cyclic compounds of conjugated diene polymers which comprises bringing at least one polymer selected from the group consisting of conjugated diene polymers and co-polymers having unsaturated bonds in the main chain or side chain into contact in solution, the polymer concentration being between about 0.1 to 2.0 percent by weight, with a catalyst composed of at least one compound selected from the group consisting of organoaluminum halides represented by the general formula $R_2AlX$ or $R_3Al_2X_3$ wherein R is an alkyl group having one to 12 carbon atoms and X is a halogen, and at least one organic halogenated compound consisting essentially of aliphatic halides, unsaturated halides, aromatic halides and halogenated -acetic acids which are represented by the general formula $CH_nX'_{3-n}COOH$ wherein X' is a halogen and n is 0, 1 or 2, the organic halogenated compound being added in amounts from 25 to 300 mol per cent on the basis of the organoaluminum halide.

2. A process according to claim 1, in which said conjugated diene polymers and copolymers have in their polymer chains at least one unit selected from the group consisting of units which can be represented as

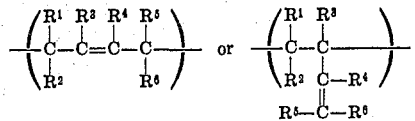

wherein $R^1$ to $R^6$ are hydrogen atoms, alkyl groups or aryl groups.

3. A process according to claim 1, in which the concentration of said conjugated diene polymer in the reaction mixture is less than 1 percent by weight.

4. A process for producing cyclic compounds of butadiene polymers which comprises bringing at least one polymer selected from the group consisting of butadiene homopolymers and copolymers having unsaturated bonds in the main chain or side chain into contact in solution, the polymer concentration being between 0.4 to 1 percent by weight, with a catalyst composed of (A) at least one compound selected from the group consisting of organoaluminum halides represented by the general formula $R_2AlX$ or $R_3Al_2X_3$ wherein R is an alkyl group having one to 12 carbon atoms and X is a halogen, and (B) at least one organic halogenated compound, the catalyst component (B) being added in an amount ranging from 50 to 200 mol per cent on the basis of the amount of catalyst component (A).

* * * * *